United States Patent [19]

Johnson

[11] Patent Number: 4,624,558
[45] Date of Patent: Nov. 25, 1986

[54] MICROIMAGE RECORDER

[75] Inventor: Delmar R. Johnson, Barrington, Ill.

[73] Assignee: Bell & Howell Company, Chicago, Ill.

[21] Appl. No.: 787,812

[22] Filed: Oct. 15, 1985

[51] Int. Cl.[4] ............................................. G03B 27/30
[52] U.S. Cl. ..................................... 355/100; 355/28; 355/54
[58] Field of Search ...................... 355/27, 28, 29, 54, 355/40, 100

[56] References Cited

U.S. PATENT DOCUMENTS

| | | | |
|---|---|---|---|
| 3,782,819 | 1/1974 | Kanayama et al. | 355/54 |
| 3,796,489 | 3/1974 | Sone et al. | 355/54 |
| 4,174,174 | 11/1979 | Hunter et al. | 355/54 |
| 4,278,338 | 7/1981 | Baker et al. | |
| 4,332,466 | 6/1982 | Flasck | 355/27 |
| 4,343,543 | 8/1982 | Schiff et al. | 355/29 |
| 4,501,487 | 2/1985 | McCormick-Goodhart | 355/27 |

Primary Examiner—Monroe H. Hayes
Attorney, Agent, or Firm—Neal C. Johnson; Stanley J. Tomsa; Philip C. Peterson

[57] ABSTRACT

A self-contained COM (Computer Output on Microfilm) microimage recorder provides completed microfiche records of computer generated images. A master film strip travels a path including exposure, developing and duplication stations. An optics assembly at the exposure station exposes a pattern of numerous images provided serially by a cathode ray tube onto an image area of the master film strip. The entire image area is developed by heat at the developing station. A duplicate film strip moves along a path merging with the master film path at the duplication station where an entire pattern of images is duplicated onto an image area of the duplicate film strip from a developed image area of the master film strip. Duplicate film image areas are cut from the end of the strip as individual microfiche records and exit from the recorder as completed records after being developed and cleared.

32 Claims, 12 Drawing Figures

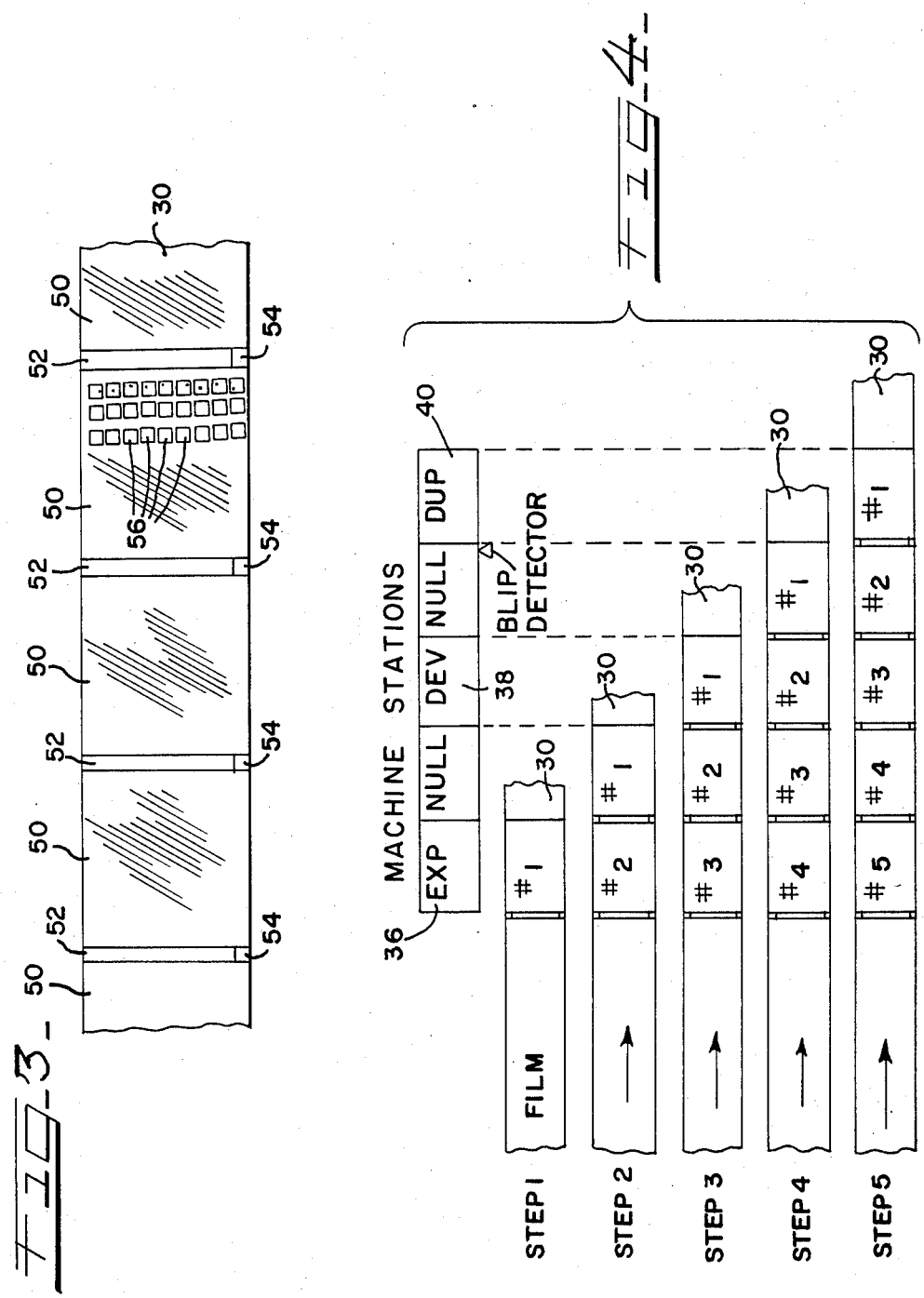

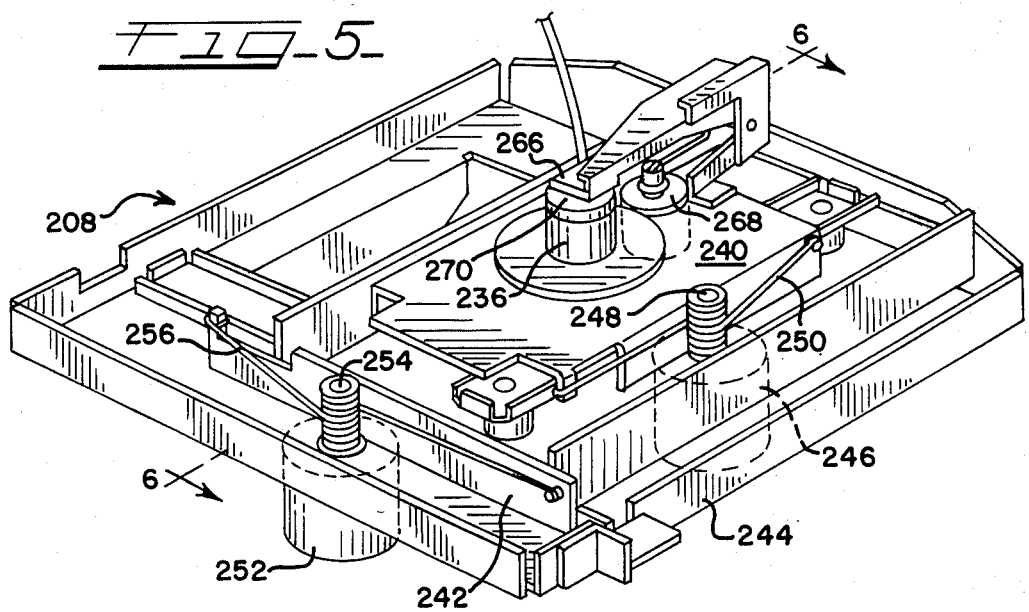
_Fig-5_
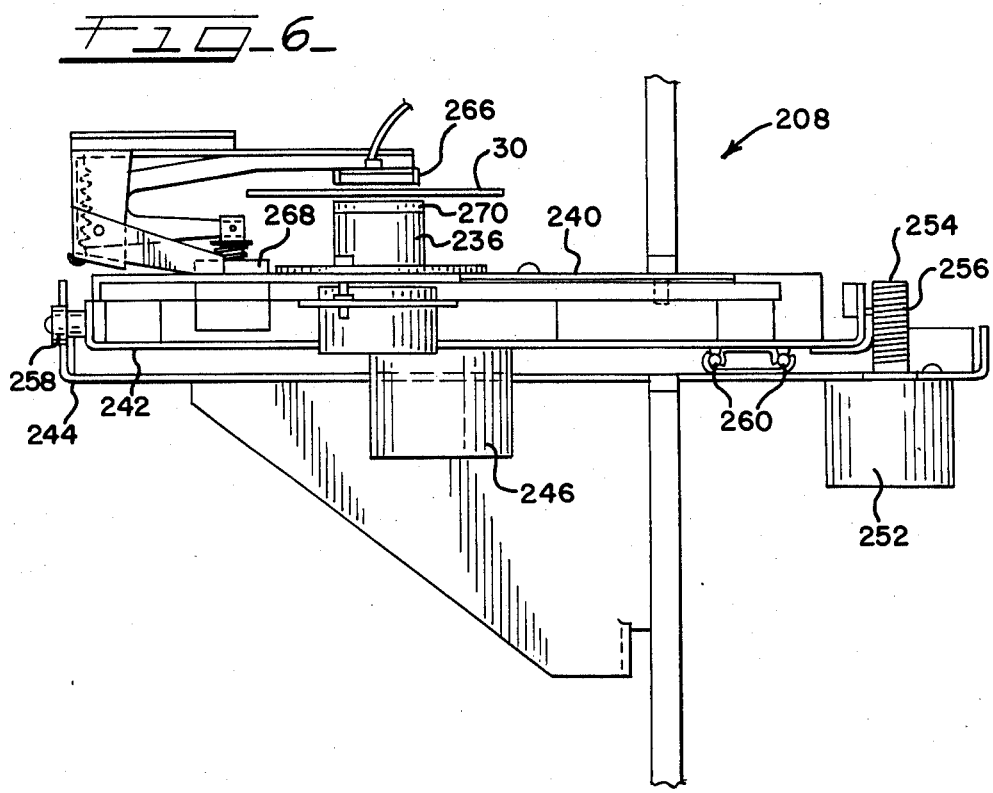
_Fig-6_

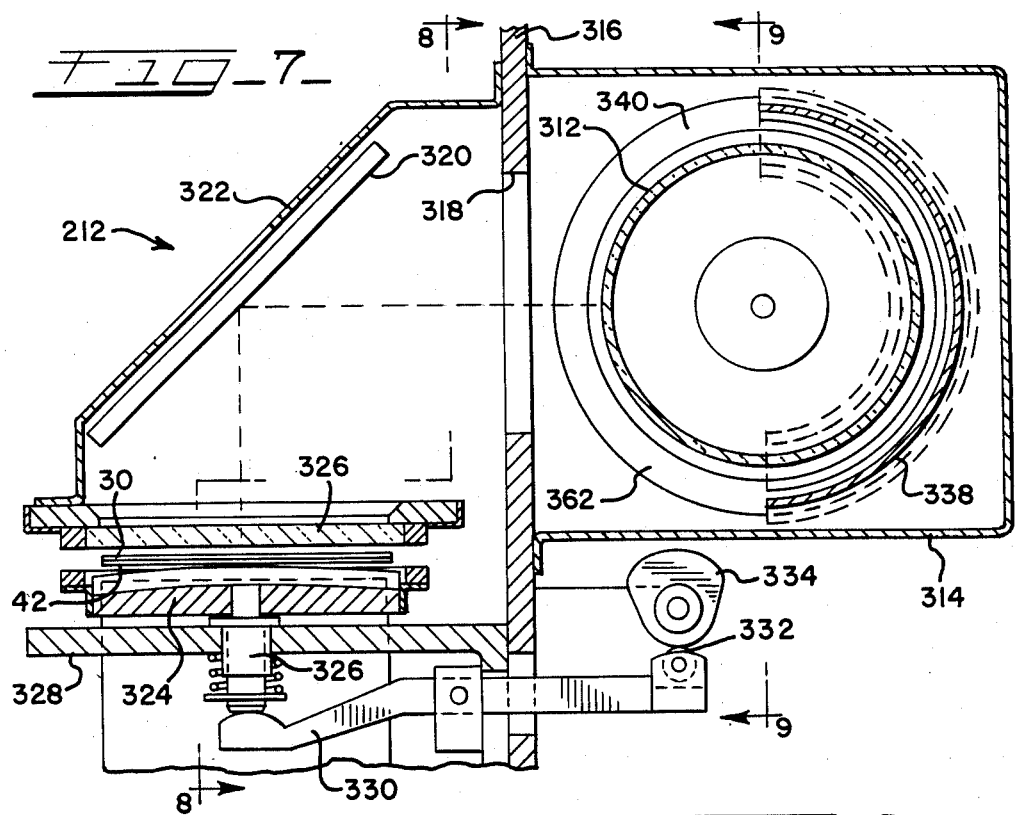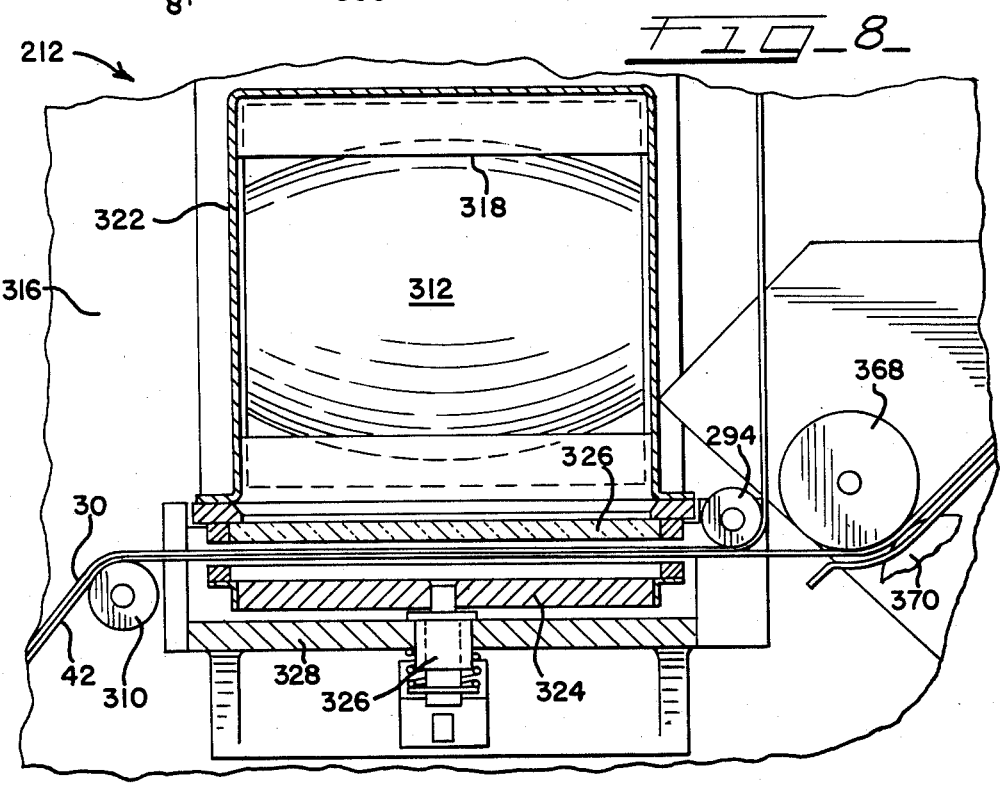

FIG-9-
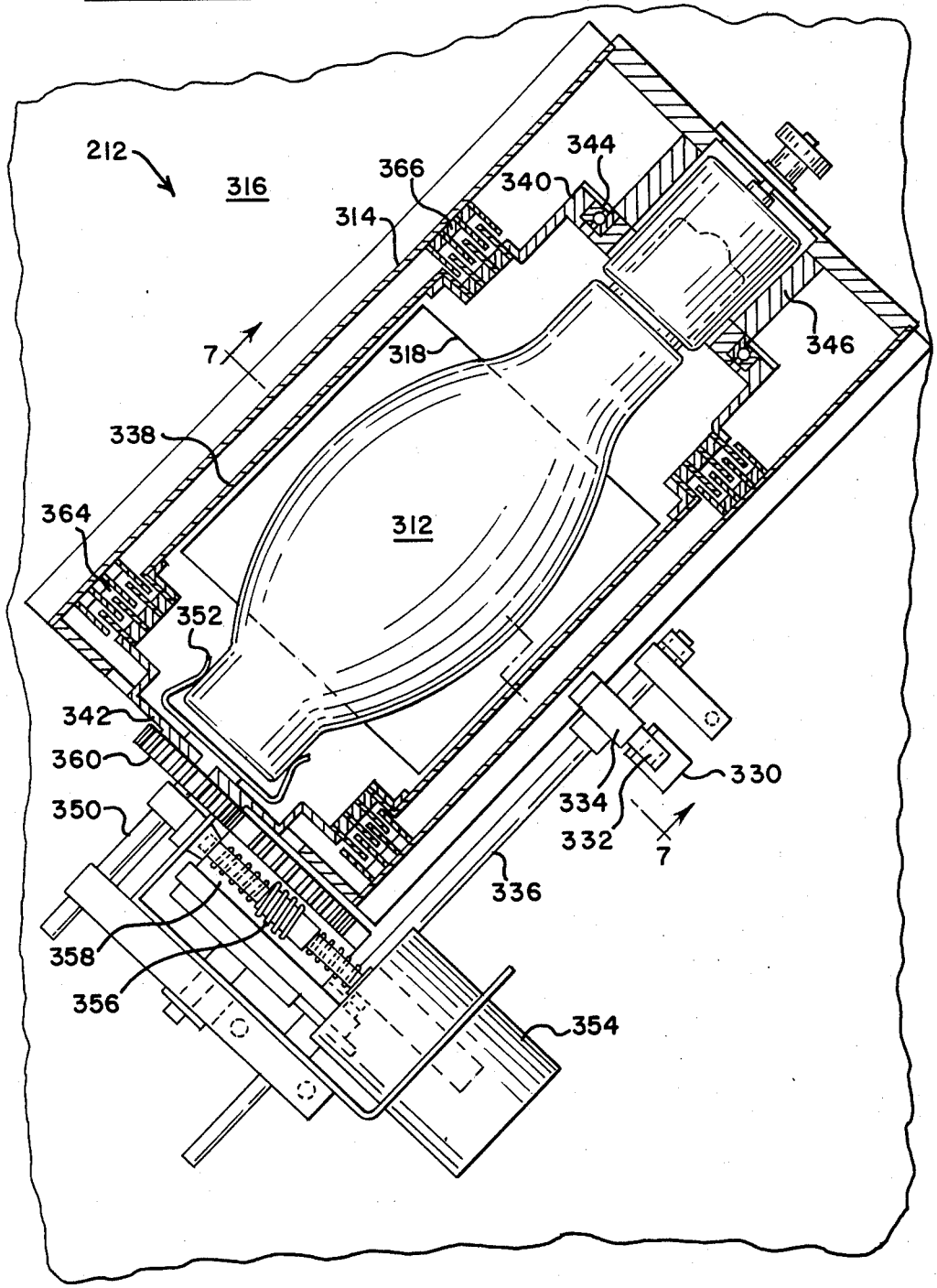

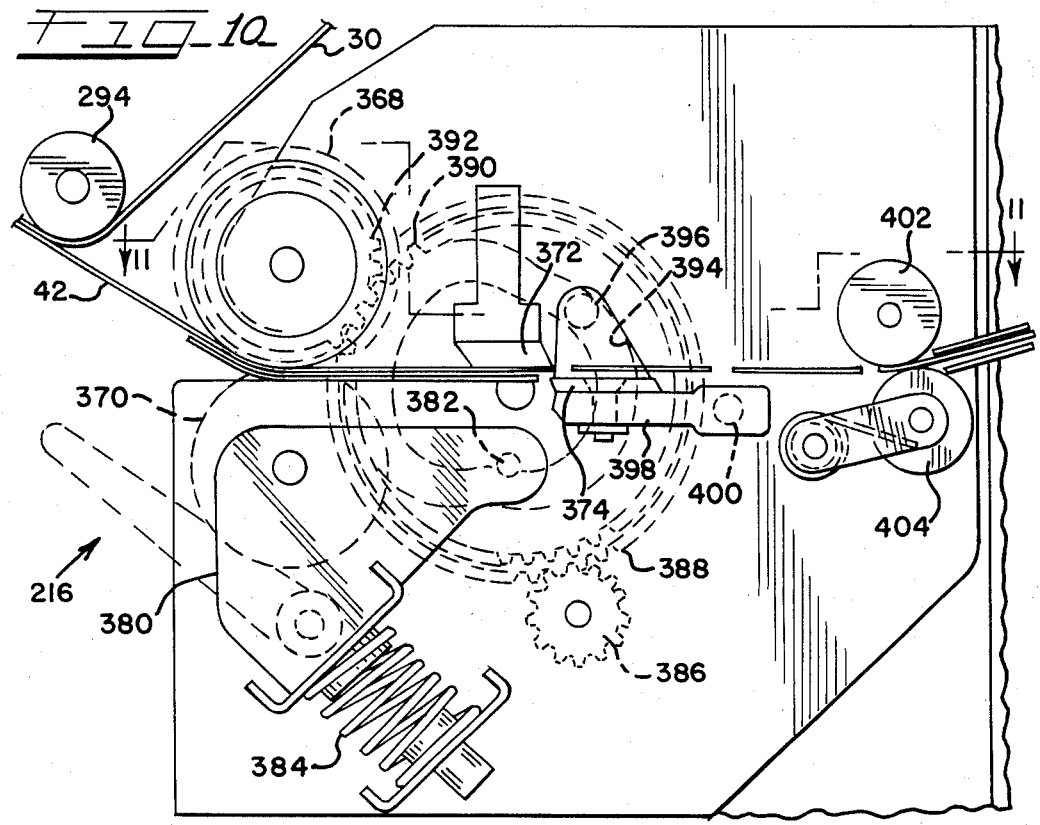
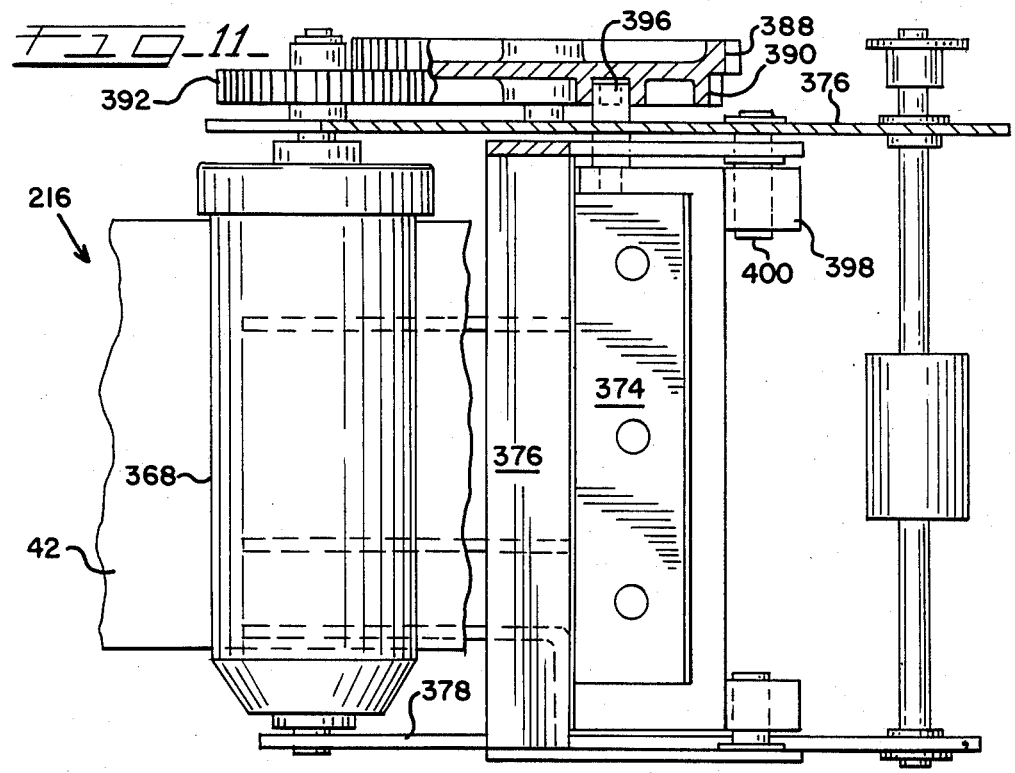

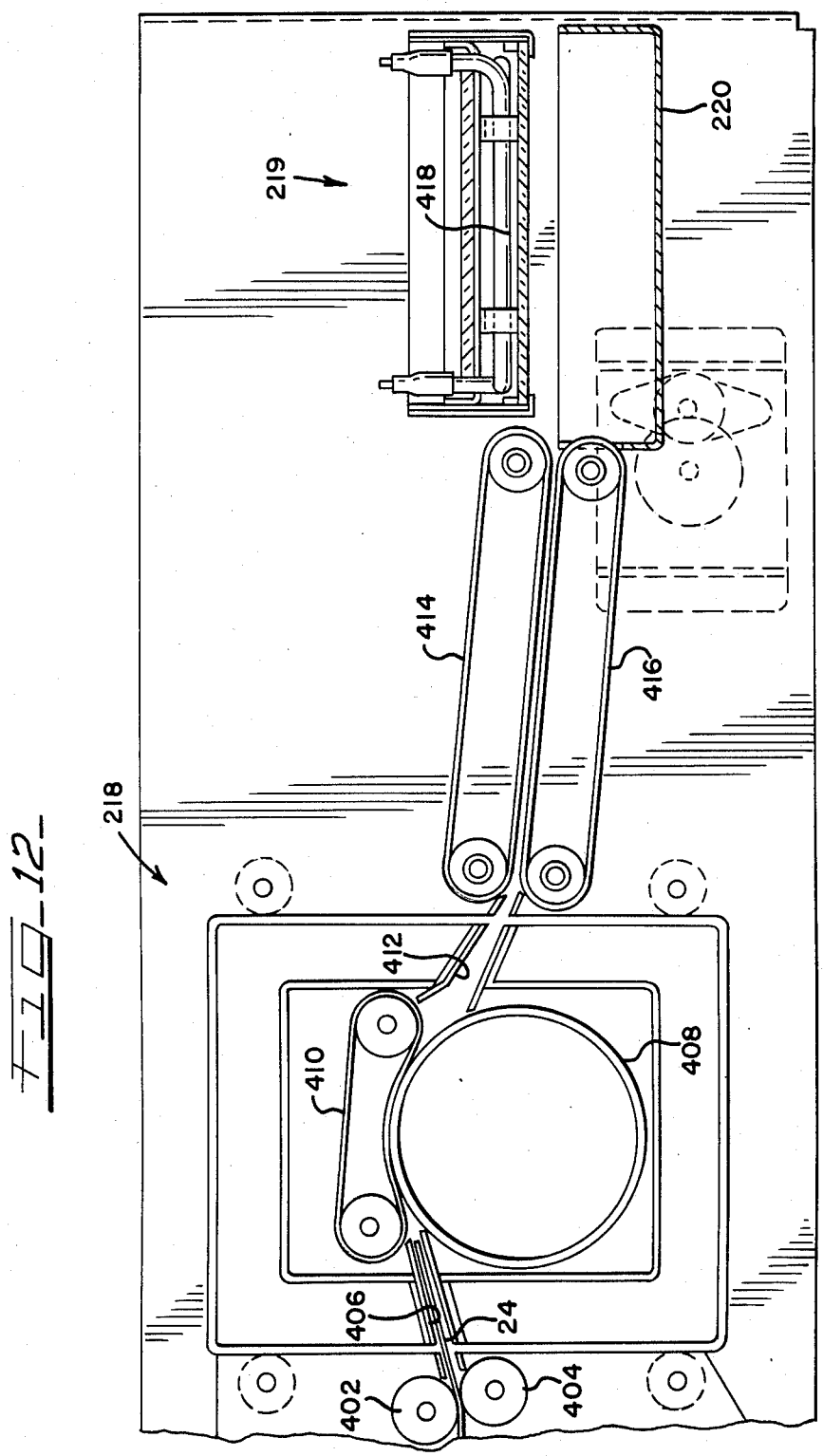

MICROIMAGE RECORDER

BACKGROUND OF THE INVENTION

The present invention relates to micrographics and more particularly to improvements in systems and methods for microimage recorders such as COM (Computer Output on Microfilm) recorders.

The use of microimage records such as microfilm rolls or microfiche cards to retain, distribute and display the enormous amounts of information and data generated by computers and other sources has increased dramatically in recent years It is far more economical and efficient to record & distribute microimage records than huge stacks of computer generated and printed documents.

U.S. Pat. Nos. 4,123,157; 4,332,466; 4,382,675 and 4,501,487 disclose microimage recorders where images are exposed onto film and then transferred onto microfiche cards or roll film. In the '466 patent, a linear array of images is exposed onto a master film 5 from a cathode ray tube (CRT) and subsequently transferred onto a film 19'. A carriage 20 supporting the film 19' is moved relative to the film 5 each time a single image or frame is to be transferred. In the '487 patent, a linear array of images is exposed from a document receiving platform onto a film 12. Images are transferred to a microfiche film card carried in a carriage 54 moved each time an image is to be transferred.

In the '675 patent, a CRT display is imaged onto a film within a cassette mounted on a carriage assembly 39. Carriage 39 is moved along rods 40 to a transfer station 43 where the image is transferred onto a film 42a. Film 42a is disposed on a carriage 45 shiftable relative to the first carriage assembly 39 to transfer the image frames. Another example of transferring film images using systems with shiftable carriages is shown in the '157 patent.

In all of the systems disclosed in the above-mentioned patents, the master film and/or the duplicate film are disposed on shiftable carriages with the attendant structural and control complexities. None is concerned with dispensing individual completed microfiche records from a self-contained microimage recorder.

SUMMARY OF THE INVENTION

Among the important objects of the present invention are to provide improved, simplified and economical microimage recorders such as COM recorders. Other objects are to provide an integral or self-contained recorder in which computer output data or the like is delivered from the machine in completed form as individual microfiche records; to provide a system wherein master film and duplicate film are processed within the machine in strip form, and wherein end portions of the duplicate film strip are cut from the film as microfiche records; to provide a system in which the master film and duplicate film are moved along continuous or linear paths without the necessity for movement relative to one another in carriages or the like; to provide systems and methods in which exposure of a pattern of images onto the master film and duplication of an image pattern from the master film onto the duplicate film are achieved without the necessity for movement of either film during these processing steps; and to provide other improvements in operating systems and methods for microimage recorders.

In brief, the above and other objects of the invention are achieved by providing a microimage recording system including exposure, master developing and duplication stations along a master film strip path. An optics assembly at the exposure station sequentially projects a pattern or array of numerous discrete light images onto an image area of the master film while the master film strip is stationary. An image area of the master film strip is heated at the master developer station to simultaneously develop the entire array of exposed images in the image area. The entire array of exposed and developed master film strip images is transferred onto the duplicate film as exposed images at the duplication station.

The system is self-contained within a housing including an output port. The duplicate film is provided in strip form and moves along a duplicate film processing path merging with the master film path at the duplication station. Exposed images on the duplicate film are cut from the end of the duplicate film strip as individual microfiche records and are delivered to the output port after developing.

BRIEF DESCRIPTION OF THE DRAWINGS

The above and other objects and advantages of the invention may best be understood from consideration of the following detailed description of the embodiments of the invention shown in the accompanying drawings, wherein:

FIG. 3 illustrates a segment of an exemplary strip of master film having a sequence of image areas processed by the microimage recorder of FIG. 1 or of FIG. 2;

FIG. 4 illustrates the process sequence of the master film at various processing stations along the master film path in the microimage recorder of FIG. 1 or of FIG. 2;

FIG. 5 is an enlarged, perspective view of components of the exposure station of the microimage recorder of FIG. 2;

FIG. 6 is a sectional view taken along the line 6—6 of FIG. 5;

FIG. 7 is a sectional view through the duplication station of the microimage recorder of FIG. 2 taken from lines 7—7 of FIGS. 2 and 9;

FIG. 8 is a sectional view of the duplication station taken from line 8—8 of FIG. 7;

FIG. 9 is a sectional view through the shutter mechanism of the duplication station taken from line 9—9 of FIG. 7;

FIG. 10 is an enlarged view showing the duplicate film cutting station of the microimage recorder of FIG. 2;

FIG. 11 is a sectional view taken along the line 11—11 of FIG. 10; and

FIG. 12 is an enlarged view of the duplicate film developing and clearing stations of the microimage recorder of FIG. 2.

DESCRIPTION OF THE PREFERRED EMBODIMENTS

Figure 1:
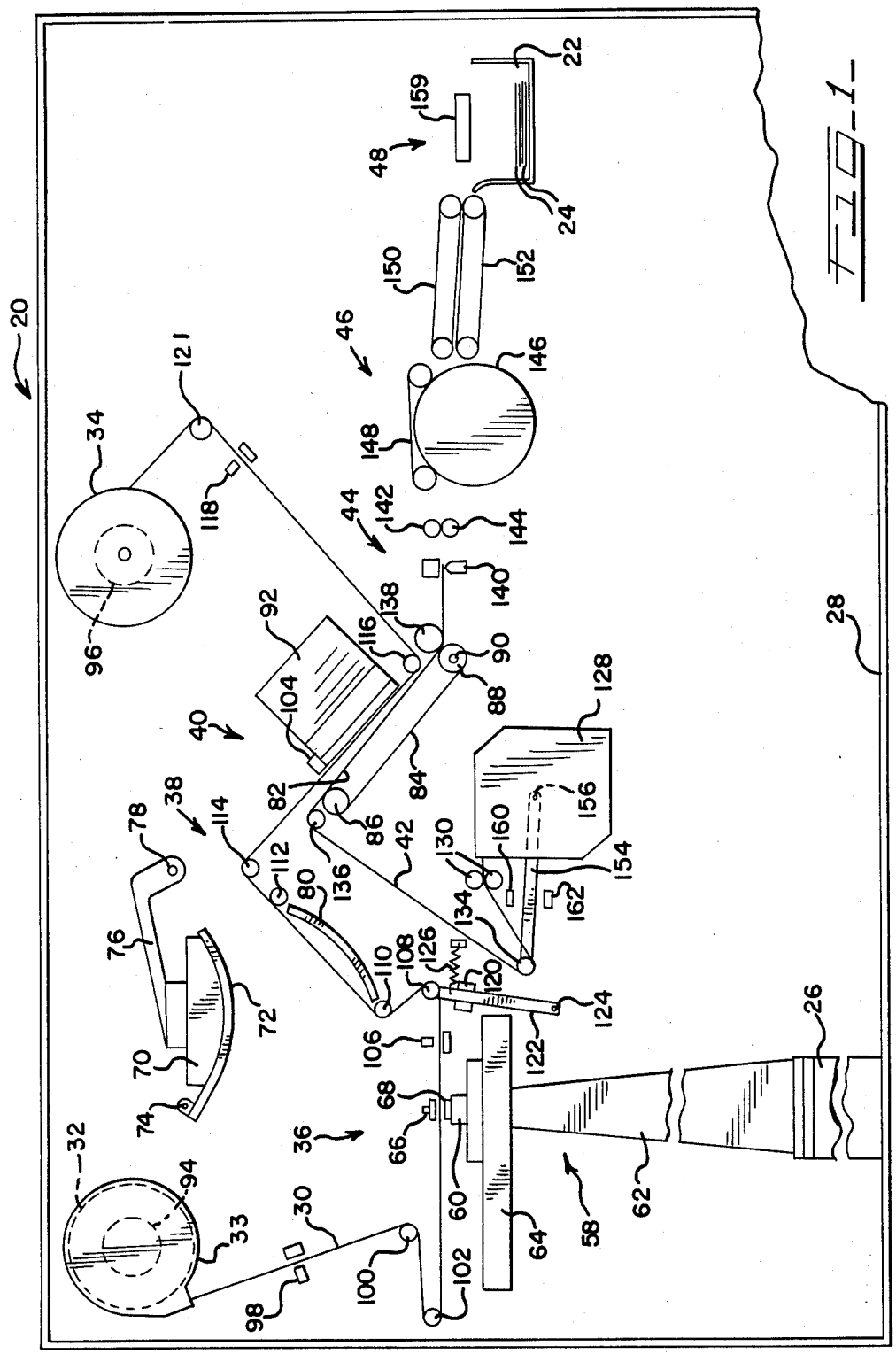
FIG. 1 is a schematic and diagrammatic front view of a microimage recorder embodying the present invention.

Having reference now to the drawings, and initially to FIG. 1, there is illustrated in schematic and diagrammatic form a self-contained microimage recorder designated as a whole by the reference numeral 20 and constructed in accordance with the principles of the present invention. Recorder 20 is an integral or unitary apparatus serving to provide at a recorder output port 22 completed discrete microfiche records or cards 24 bearing an image pattern corresponding to a sequence of computer generated images provided by a cathode ray tube (CRT) 26. It should be understood that features of the present invention are applicable to various types of COM (Computer Output on Microfilm) and other microimage recording systems whether using CRT displays, master scan laser imaging or other imaging or display arrangements.

A single self-contained housing 28 contains the components of the microimage recorder 20. A strip 30 of master film travels along a processing path extending between a supply spool 32 and a take up spool 34 through an exposure station generally designated as 36, a master film developing station generally designated as 38 and a duplication station generally designated as 40. A supply of duplicate film 42 in strip form moves along a duplicate film processing path including the duplication station 40, a cutting station generally designated as 44, a duplicate film developing station generally designated as 46 and a clearing station generally designated as 48.

The master film strip 30 and the duplicate film strip 42 move along linear or continuous paths and an X-Y pattern or array of images is provided on the completed microfiche records 24 without the necessity for complex relative movement or film carriages or the like. The duplicate film strip 42 is consumed within the self-contained microimage recorder 20 by cutting of individual microfiche records 24 from the end of the strip 42.

A segment of the master film strip 30 is shown in FIG. 3. In the illustrated embodiments of invention, the master film is a 105 millimeter dry silver COM film such as type 8500 film offered by 3M Corporation. This film is sensitive to light and preferably is maintained in light-tight enclosures until imaged and developed. In the illustrated arrangement, the supply spool 32 for the master film strip 30 is within a light-sealed cartridge 33 (FIG. 1).

After processing within the microimage recorder 20 in the manner described in detail below, the master film strip 30 as shown in FIG. 3 includes a sequence or linear array of image areas 50 separated by guard bands 52 providing margins which are desirable when the image areas 50 are developed by the application of heat. Indexing blips 54 are generated in the region of the guard bands 52 to assist in controlling the travel of the master film strip 30 along its processing path. Blips may be provided at other locations on the film if preferred.

Each image area 50 includes an array or pattern of discrete images or frames 56. In the illustrated system, the images are in an X-Y pattern of rows and columns. Other patterns or arrays are possible, as are partial patterns and other alternatives. In a typical format, 270 images or frames may be included on each image area 50. If desired, the image areas may also be provided with titles or other machine or human readable indicia (not shown).

Referring again to FIG. 1, a pattern or array of images is exposed onto an image area 50 of the master film strip 30 at the exposure station 36. An optics assembly generally designated as 58 includes a lens 60 for focusing light images provided by the CRT 26 onto the master film 30. A movable light shroud 62 confines light from the CRT to the desired region. An X-Y positioner 64 moves the lens 60 to numerous different positions in rows and columns or other pattern in any desired sequence within a master film image area 50. The lens 60 is repositioned between successive operations of the CRT 26 while the master film strip 30 remains stationary in order to create a latent or undeveloped array or pattern of individual images 56. The X-Y positioner may be of the type used in the microimage recorder 20 illustrated in FIGS. 2, 5 and 6 and described below. During exposure of each discrete image or frame, an aperture clamp 66 closes against a lens aperture block 68 precisely to position the master film in the proper plane for exposure.

Simultaneous development of the latent, exposed images within an image area 50 of the master film strip 30 is carried out at the master film developing station 38 by the application of heat. A developer shoe 70 is maintained at a predetermined temperature and is normally covered by a heat shield 72 pivotable about axis 74. Shoe 70 is carried by a pivot arm 76, and in a developing operation, the shoe 70 pivots down against film strip 30 about a pivot axis 78 while the heat shield 72 swings out of the way. An image area 50 of the master film strip 30 is held in intimate contact with shoe 70 over a back up member 80 for a predetermined time interval until development is complete.

An entire array or pattern of developed images is transferred to a corresponding image area of the duplicate film strip 42 at the duplication station 40 where the master film path and the duplicate film path merge. A vacuum transport 82 holds the master film and duplicate film stationary and in contact with one anothe during a duplication operation. The vacuum transport 82 includes an endless perforated belt 84 trained around rollers 86 and 88 and is pivotally movable about an axis 90. Vacuum within belt 84 holds the duplicate film strip 42 firmly against the vacuum transport 82 and cooperates in moving the strip 42 along the duplicate film processing path. As described in detail in the above-referenced application, the duplication station 40 includes a reflector housing 92 associated with a safety shutter and a main shutter for permitting light from an exposure lamp to expose an image area on the duplicate film strip in accordance with the developed image area on the master film strip.

FIG. 4 illustrates in tabular form the sequence of processing operations carried out on the master film strip 30 in the exposure, developing and duplication stations 36, 38 and 40. Step 1 illustrates a first image area 50 designated as #1 at the exposure station 36. For example, at the start of a cycle of numerous repetitive operations of the microimage recorder 20, the master film strip is advanced from cartridge 33 to the exposure station 36 and stopped. While the film is stationary, a pattern or array of numerous discrete images is exposed one at a time onto the image area #1.

When exposure of the desired pattern of images at image area #1 is completed, the master film strip 30 is advanced along the film path one step through a distance equal to the length of one image area 50 plus one guard band 52 to position image area #2 at the exposure station. While image area #2 is being exposed, image area #1 resides in a first null position. Although FIG. 1 is not necessarily to scale, it should be understood that the null position is that portion of the master film processing path between the exposure station 36 and the developing station 38.

After image area #2 is exposed, the master film strip 30 is advanced another step to position image area #3 at the exposure station. At this point in the process, image area #2 is at the first null position and image area #1 is located at the developing station 38. While the film is stationary in this position labelled as "STEP 3", image area #3 is exposed while image area #1 is developed.

When these operations are completed, the film is advanced another step to the position indicated as "STEP 4". In order to prevent damage to the developed images, the master film strip 30 is preferably not moved following a developing operation until sufficient time has elapsed to permit cooling of the heated emulsion. When the film is advanced, developed image area #1 resides at a second null position along the film path between the developing station 38 and the exposure station 40.

After image area #4 is exposed and image area #2 is developed, the master film strip 30 is advanced another step as indicated in "STEP 5" to position image area #1 at the duplication station, #3 at the developing station and #5 at the exposure station, with image areas #2 and #4 at the null positions. At this time exposure, developing and duplication operations may occur simultaneously at image areas #5, #3 and #1, respectively. In order to prevent interference with the exposure operation due to mechanical shock or vibration, the exposure operation is interrupted during movement of machine components such as the developer shoe 70 and the vacuum clamp 82.

An important advantage of this film processing sequence is that the master film strip 30 need only move along a continuous and linear path between the supply spool 32 and take up spool 34 without the necessity for shifting in a transverse direction relative to the duplicate film strip 42. The positioning of the lens 60 by the X-Y positioner 62 provides the array or row and column pattern of images 56, and this array or pattern is subsequently developed and duplicated as a unit.

In order to control the movement of the master film strip 30 along the master film processing path, a supply drive motor 94 and a take up drive motor 96 are provided. Preferably, both drive motors are DC motors connected to drive the supply spool 32 and the take up spool 34. When a supply cartridge 33 is loaded into the microimage recorder 20, the leading end of the master film strip 30 is threaded into the processing path leading to the take up spool 34. Preferably a leader permanently associated with the take up spool 34 and initially positioned in the master film strip path is attached to the leading end of the master film strip 30 adjacent the cartridge 33. When the strip 30 of master film is depleted, motor 94 is operated to rewind strip 30 into the cartridge 33 and to return the leader along the master film path to the vicinity of the cartridge 33. Strip 30 can then be detached from the leader and a new cartridge may be loaded.

Within the self-contained microimage recorder 20, the film strip travels from the spool 32 through a film clamp 98 and around an idler roller 100 to an encoder roller 102. As described in more detail in U.S. Pat. No. 4,148,579, incorporated herein by reference, the encoder roller 102 is associated with a transparent disc having a plurality of uniformly spaced marks interrupting a light path between a light source and a photodetector to provide output pulses counted by a logic circuit accurately to detect the amount of film movement.

Film position is detected in combination with the encoder roller 102 by means of the blips 54 and a blip detector 104 positioned adjacent the duplication station 40. Blips 54 are applied to the film strip 30 by the optics assembly 58 of the exposure station 36 and may be located in the guard bands 52 as illustrated in FIG. 3 or in any other desired region of the master film 30. Each time a blip is sensed by the blip detector 104, this information is used by a control system in combination with information received from the encoder roller 102 accurately to position image areas 50 in the processing stations along the master film strip processing path.

The master film strip 30 leaving the exposure station 36 travels through a second film clamp 106 and around a dancer roller 108 to the developing station 38 where a pair of rollers 110 and 112 support the film strip at opposite ends of the back up member 80. From the developing station, the master film strip 30 moves around a roller 114 to the duplication station 40, and then is guided by a roller 116 through a third film clamp 118 and by a final roller 121 to the take up spool 34.

A normal film tension, for example about five pounds, is maintained on the master film strip 30. Each time the film is advanced one step, the take up drive motor 96 is energized to pull the strip through the processing path. Supply drive motor 94 may also be energized to provide a predetermined drag. When the film has reached the desired position as determined by the blip detector 104 and/or the encoder roller 102, the film is stopped and film clamp 106 is moved from its open to its closed position accurately to locate the film adjacent the exposure station 36. After clamp 106 is closed, the take up and supply motors 96 and 94 are energized to apply the predetermined normal tension to the strip 30. Clamps 98 and 118 are then closed to maintain this tension independently of the motors 94 and 96. It will be understood that the above described film clamps 98, 106 and 118 engage the film at the guard bands 52 to avoid "pressure fogging" the image areas or abrading the emulsion or otherwise damage an image area.

Since heat development of the master film strip 30 at the developing station 38 depends upon intimate contact of the developer shoe 70 against the film, it is desired that increased film tension be provided in this region. Dancer roller 108 may be held stationary by a latch 120 engaging lever arm 122 mounted for pivoting movement about an axis 124. After film clamps 106, 98 and 118 are closed, the latch 120 is released so that arm 122 can pivot subject to a biasing force applied by a spring 126. As the developer shoe 70 presses the film strip 30 toward the back up member 80, dancer roller 108 moves to permit deflection of the film strip 30 and spring 126 applies a force to arm 122 sufficient to increase the tension to a higher value, for example in the neighborhood of twelve pounds. This increased tension is isolated from the exposure station by the clamp 106 and does not have an adverse affect at the duplication station 40 due to the closed condition of the transport clamp 82.

The duplicate film strip 42 is supplied to the microimage recorder 20 in a cartridge 128. The duplicate film is preferably a high contrast vesicular film exposed by light, developed by heat and cleared by light. The duplicate film strip 42 is pulled from the cartridge 128 through a pair of film drive rollers 130. The strip 42 travels around a duplicate film dancer roller 134 and around an idler roller 136 to the duplication station 40 where it is maintained by vacuum in engagement with the belt 84 of the vacuum transport 82. The duplicate film strip 42 leaves the duplication station 40 between the roller 88 and a roller 138.

Duplicate film 42 leaving the duplication station 40 is guided to the cutting station 44 including a knife member 140. Individual image areas exposed onto the duplicate film strip at the duplication station 40 are cut from the end of the duplicate film strip 42 by the knife member 140 to form individual, discrete microfiche cards or records 24. If desired, the cutting station 44 may be similar to cutting station 216 described below and illustrated in FIGS. 2, 10 and 11.

From the cutting station 44, individual records 24 are advanced by feed rollers 142 and 144 to the duplicate film developing station 46 where the records 24 are held against a rotating heated drum 146 by a roller-mounted pressure belt 148.

Developed microfiche records 24 leaving the developing station 146 are transferred by roller-mounted feed belts 150 and 152 to be deposited in the machine exit port 22. Exit port 22 in the illustrated arrangement is in the form of a tray or hopper easily accessible from the exterior of the housing 28. Clearing station 48 is associated with the exit port 22 and includes a clearing lamp 159 applying a film clearing radiation to each completed microfiche record 24 as it reaches the exit port 22. If desired, the developing station 46 and the clearing station 48 may be similar to the developing and clearing stations 218 and 219 illustrated in FIGS. 2 and 12 and described below.

Either single or multiple microfiche records 24 may be made from each image area 50 of the master film strip 30. When multiple microfiche records 24 are made from a single developed image area 50 of the master film strip 30 at the duplication station 40, the master film strip 30 is not advanced and exposure and master film developing operations are not carried out between successive operations of the duplication station 40. A first image area is exposed on the duplicate film strip 42 at the duplication station, and the duplicate film strip is advanced to the position shown in FIG. 1 with the leading edge at the cutting station 44. While the first latent or undeveloped image area at the leading end of the duplicate film strip 42 is at this null position between the duplication station and the cutting station 44, the duplication station 40 is operated again to duplicate a second copy of the same image area 50 from the master film strip 30 onto the next adjacent region of the duplicate film strip 42. After the second exposure, the duplicate film strip is advanced one step to move the first exposed image area past the knife member 140 of the cutting station 44. This first exposed image area is severed from the end of strip 42, and is developed and cleared to provide a completed microfiche record 24. This sequence of operation is repeated without movement of the master film strip 30 until the desired multiple number of records are duplicated.

A longer time is required between operations of the duplication station 40 is longer when the master film strip 30 is advanced and processed at the exposure station 36 and developing station 38. The image quality of exposed image areas on the duplicate film 42 is affected by the delay between exposure and development of the duplicate film 42. Consistent image quality is obtained by controlling the duplicate film travel to prevent extended delay as the master film strip 30 is advanced and processed.

More specifically, when single microfiche records 24 are made from each image area 50 of the master film strip 30, or when the last of a number of multiple records has been made, the duplicate film strip 42 is advanced one step following the duplication operation to place the exposed image area on the duplicate film strip 42 at the null position with the leading edge at the cutting station 44. The duplicate film strip is then advanced an additional step so that the exposed image has passed the cutting station and the exposed image area is properly positioned to be cut from the end of strip 42. Prior to cutting and development of the exposed image as a microfiche record 24, a delay period is provided equivalent to the time required for each duplication of multiple image areas from a single master film image area in order that consistent delay time and image quality are obtained. After the delay period, the exposed image area of the duplicate film is cut, developed and cleared.

When the exposed image is cut, an unexposed area resides in the null position of the duplicate film path between the duplication station 40 and the cutting station 44. Wastage of this unexposed area is avoided by reversing the travel of the duplicate film strip to retract the unexposed leading end of the duplicate film strip into the duplication station 40. The vacuum belt 84 is moved in the reverse direction to retract the duplicate film strip.

Dancer roller 134 is mounted on an arm 154 pivoted at axis 156. The weight of the arm 154 causes the dancer roller 134 to take up slack in the duplicate film strip 42 when it is retracted. A pair of detectors in the form of switches 160 and 162 detect alternate extreme positions of the arm 154 and dancer roller 134. If duplicate film strip tension is lost as by breakage of the film strip 42, the arm 154 moves against switch 162 to provide a signal. Switch 160 controls the duplicate film strip drive rollers 130 to feed additional film strip 42 into the duplicate film strip path upon demand.

Figure 2:
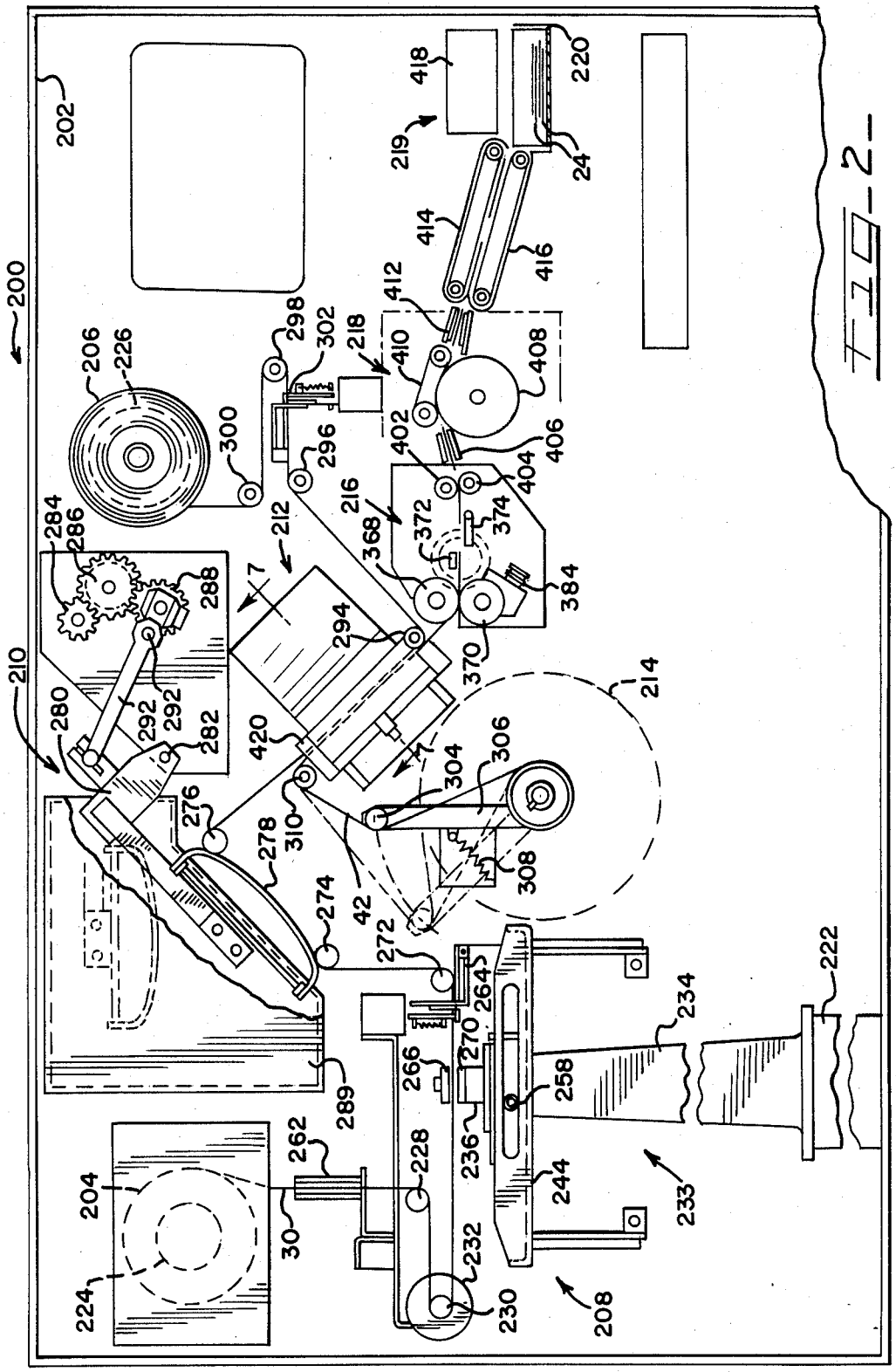
FIG. 2 is a schematic and diagrammatic front view of a microimage recorder comprising an alternative embodiment of the present invention.

Referring now to FIG. 2, there is illustrated in schematic and diagrammatic form a microimage recorder generally designated as 200 and comprising an alternative embodiment of the present invention. The microimage recorder 200 may utilize a master film strip 30 and duplicate film strip 42 identical to those described above in connection with the microimage recorder 20 of FIG. 1. The processing operations performed on the film strips 30 and 42 are analogous in the microimage recorder 200, and the descriptions relating to the master film and the master film processing operations shown in FIGS. 3 and 4 are equally applicable.

In general, microimage recorder 200 is a self-contained and unitary apparatus with a self-contained housing 202 within which the master film strip 30 moves from a supply spool 204 through a master film processing path to a master film take up spool 206. Processing stations along the master film path include an exposure station generally designated as 208, a developing station generally designated as 210 and a duplication station generally designated as 212. The duplicate film strip 42 moves along a duplicate film processing path from a supply spool 214 through the duplication station 212, a cutting station 216, a duplicate film developing station 218 and a clearing station 219.

Recorder 200 provides at an output port 220 completed discrete microfiche records or cards 24 bearing an image pattern corresponding to a sequence of computer generated images provided by a CRT 222. The master film strip 30 and the duplicate film strip 42 move along linear or continuous paths and an X-Y pattern or array of images is provided on the completed microfiche records 24 without the necessity for complex relative movement or film carriages or the like. The duplicate film strip 42 is consumed within the self-contained microimage recorder 200 by cutting of individual microfiche records 24 from the end of the strip 42.

Master film strip 30 is dispensed from the supply spool 204 to the take up spool 206, the spools 204 and 206 having respective drive motors 224 and 226. Strip 30 is fed from spool 204 around an idler roller 228 and an encoder roller 230 situated at the film input side of the exposure station 208. Encoder roller 230 is associated with an encoder disc 232 providing signals accurately indicating film movement in the manner referred to above and described in U.S. Pat. No. 4,148,579.

Image areas 50 of the master film strip 30 are provided with an array or pattern of exposed images from the CRT 222 at the exposure station illustrated in FIGS. 2, 5 and 6. Images from the CRT 222 pass through an optics assembly 233 including an elongated tubular light shroud 234 and a lens 236 movable relative to the film strip 30 in X and Y directions. Light shroud 234 is movable to accommodate lens movement. In this manner, multiple images are exposed in different parts of one image area 50.

Lens 236 is movable by an X-Y positioner including a subcarriage 240 slidably mounted on a carriage 242 which is in turn slidably mounted on a portion 244 of the fixed frame of the machine. Subcarriage 240 is moved back and forth on the carriage 242 along the Y axis by a stepper motor 246 mounted on the carriage 242. Motor 246 drives a capstan 248 and a cord 250 wound about capstan 248 is secured to the subcarriage 240. Similarly, the carriage 242 is movable in the X direction. A stepper motor 252 secured on frame 244 drives a capstan 254 on which a cord 256 secured to the carriage 242 is wound. As seen in FIG. 6, carriage 242 is slidably mounted on frame portion 244 by bearings 258 and 260. Similar bearings (not shown) slidably mount the subcarriage 240 upon the carriage 242.

Since lens 236 is mounted on subcarriage 240, the lens 236 may be selectively moved in the X and Y direction by operation of the stepper motors 252 and 246. The motors may be energized in any desired sequence to move the lens in steps in a row and column pattern or other array over an image area 50 of the master film strip 30 located at the exposure station 208.

As shown generally in FIG. 2, master film strip 30 extends horizontally across the exposure station 208. Electrically actuated film clamps 262 and 264 (FIG. 2) engage the film strip 30 during the exposure operation to assist in holding the film strip stationary. In addition, as shown in FIGS. 5 and 6, a film aperture clamp 266 is actuated by a solenoid 268 to hold the film strip 30 against an aperture block 270 when each image is exposed.

The master film strip 30 leaving the exposure station 208 is guided upwardly over a roller 272 and extends across a pair of spaced rollers 274 and 276 at the master film developing station 210. An exposed image area 50 of the master film strip 30 is developed by the application of heat from a heated curved pad 278 carried by a support frame 280 pivotally supported on the machine frame at pivot axis 282.

A drive motor (not shown) rotates an output gear 284 acting through an intermediate gear set 286 to drive a gear 288. An eccentric pin 290 carried by gear 288 is coupled by crank arm 292 to the developer support frame 280. Actuation of the drive motor rotates the meshed gears 284, 286 and 288 to raise and lower the heated developer pad 278 about pivot axis 282 between the developing position shown in FIG. 2 in whole lines and the standby position shown in broken lines. In the standby position, the heated pad 278 is within a heat shield enclosure 289. When a pattern or array of images at an image area 50 of the master film strip 30 is to be developed, the pad 278 is lowered and held in intimate engagement with the strip 30 for a predetermined period of time.

Strip 30 travels from the developing station 210 around roller 276 to the duplication station 212. The film strip 30 travels through the duplication station 212, around roller 294 and rollers 296, 298 and 300 to the take up spool 206. A film clamp 302 disposed between rollers 296 and 298 is selectively operated to clamp the film at that location.

At the duplication station 212, an entire pattern or array of developed images at an image area 50 of the master film strip 30 is duplicated onto a corresponding image area of the duplicate film strip 42 supplied from the supply spool 214. Strip 42 is trained from the supply spool 214 around a dancer roller 304 mounted on a pivot arm 306 biased by a spring 308 for maintaining tension in the strip 42. From the dancer roller 304, the duplicate film strip 42 extends around a roller 310 into the duplication station 212 where the duplicate film path and the master film path coincide.

As best seen in FIGS. 7, 8 and 9, the duplication station 212 includes a lamp 312 which may, for example, have a 400 watt output. Lamp 312 is mounted within a housing 314 secured to a wall 316 of the machine frame. Lamp 312 may be of the type having an arc emitting ultraviolet light. Its light is directed through an opening 318 in wall 316 and against a mirror 320 (FIG. 7) secured within a reflector housing 322 attached to the opposite side of wall 316. Mirror 320 reflects light downwardly toward the developed image area 50 of the master film strip 30 and through the master film strip 30 against the duplicate film strip 42. Opening 318 is arranged to direct light only against the mirror 320 and to prevent direct radiation toward the master film strip 30.

During the duplication process, the master film strip 30 and duplicate film strip 42 are held stationary and are clamped in contact with one another by a movable clamp member 324. The film strips are clamped against a transparent glass wall 325 located beneath the mirror 320.

Clamp member 324 is moved by a mechanism best seen in FIG. 7. A pin 326 extends down through a plate 328 carried by wall 316 and engages a follower arm 330. The opposite end of arm 330 carries a cam follower roller 332 engaging a cam 334. Cam 334 is carried by a drive rod 336 (FIG. 9) rotated by a motor (not shown) in order to pivot follower arm 330 up and down and raise and lower the clamp member 324.

A rotary shutter 338 controls the duration of light exposure from the lamp 312 onto the film strips 30 and 42. As best shown in FIG. 9, shutter 338 is mounted coaxially about the lamp 312 and includes a cylindrical wall carrying end members 340 and 342. End member 340 is journaled for rotation about the shutter axis by a bearing assembly 344 mounted on a collar 346 secured to the housing 314.

The opposite end member 342 of the shutter 338 is journaled about a fixed shaft 350 including an inner flange supporting a lamp mounting clip 352. The shutter is rotated by means of a drive motor 354 coupled to end member 342 by a worm gear 356, an intermediate gear unit 358 and a drive gear 360.

As seen in FIG. 7, the cylindrical wall of the shutter 338 includes an aperture 362. In the position illustrated in FIG. 7, the aperture is disposed between the lamp 312 and the mirror 320 in the duplication exposure position. Motor 354 is selectively operated to rotate the shutter 366 to position the shutter 338 in an alternate position blocking the travel of light from the lamp 312 to the mirror 320. A pair of labyrinth seal units 364 and 366 (FIG. 9) near the opposite ends of the shutter 336 prevent the escape of light so that light is emitted only through the aperture 362 when desired.

Cutting station 216 as illustrated in FIGS. 2, 10 and 11 includes a pair of drive rollers 368 and 370 receiving the duplicate film strip 42 after it exits the duplication station 212 and separates from the master film strip 30 traveling around roller 294 toward the take up spool 206. Within the cutting station are mounted a fixed knife blade 372 and a movable knife blade 374 for cutting an individual microfiche record 24 from the end of the duplicate film strip 42. The movable blade 374 and the drive rollers 368 and 370 are operated in a timed sequence for moving the duplicate film strip 42 the proper distance past the knife blades and then for operating the knife blades to sever an end segment of the strip 42.

More specifically, drive roller 368 is ournaled for rotation about a fixed axis in a pair of cutting station side frame members 376 and 378 (FIG. 11). Drive roller 370 is carried by a frame 380 pivoted about an axis 382 (FIG. 10) and a spring 384 biases roller 370 toward roller 368.

A cutter station drive motor (not shown) rotates a pinion gear 386 engaging one gear 388 of an interrupted drive gear set including a second gear 390 engageable with a feed drive gear 392 secured to feed roller 368. A cam track at one side of the interrupted gear set guides a cam follower roller 396 carried by a lever 398 pivoted at axis 400 and supporting the movable knife blade 374. In order to carry out a cutting operation at the cutting station 216, the drive motor is operated to rotate gears 388, 390 and 392 causing rotation of the drive rollers 368 and 370 to advance the strip 42 through the cutting station. After a predetermined distance of travel gear 390 reaches an interrupted, non-toothed portion while cam follower roller 396 moves radially outward in the cam track 394 to move blade 374 upwardly to cut a microfiche record 24 of the proper length from the end of the stopped duplicate film strip 42. The cutting preferably is controlled so that each record 24 includes a duplication of one entire image area 50.

After cutting of a microfiche record 24 from the end of the duplicate film strip 42, the record 24 is advanced between feed rollers 402 and 404 to the duplicate film developing station 218 (FIGS. 2 and 12). A guide track 406 introduces the leading edge of the record 24 to the nip of a rotating, heated developer drum 408 and a roller-mounted pressure belt 410. As the drum 408 rotates, the record 24 is held in contact with the drum beneath belt 410 for a predetermined time during which heat from the drum 408 develops on the record 24 the image array duplicated onto that record at the duplication station 212.

The developed record 24 leaving the developer station 218 is guided by a track 412 and by a pair of transfer belts 414 and 416 to the clearing station 219 and output port 220. The output port takes the form of a hopper or tray readily accessible from the exterior of the machine housing 202 into which completed microfiche records 24 are deposited. The clearing station 219 is associated with the output port and includes a lamp 418 illuminating each completed microfiche record 24 for the brief period of time, about five seconds, required to clear the record. A neon type bulb of low wattage emitting light in the blue spectrum serves to remove a tint present in the record 24 following the exposure and development operations to provide a clearer and more desirable image pattern.

In overall operation, the microimage recorder 200 of FIG. 2 operates in the same sequence described above in connection with the mircoimage recorder 20 of FIG. 1. As shown in FIG. 3, the processed master film strip 30 includes discrete image areas 50 each including an entire array of individual images 56 created in an X-Y pattern by the X-Y positioner. The image areas 50 are separated by guard bands 52 and blips 54 are applied to the guard bands 52. A blip detector 420 (FIG. 2) is located near the duplication station 212 and together with the output signal from encoder disc 232 enables the master film strip 30 precisely to be positioned.

Although FIG. 2 is not necessarily to scale, the distance separating the exposure station 208 and the developing station 210 and the developing station 210 and the duplication station 212 is equal in length to one image area 50 plus two guard bands 52 so that first and second null positions are provided as indicated in tabular form in FIG. 4. Or described in terms of film travel distance, an image area shown at numeral 1 in FIG. 4 (and its associated guard band) would be moved to the developing station through a distance equaling the length of two image areas and two guard bands. The processing sequence of the master film strip 30 is carried out in the processing stations 208, 210 and 212 in the manner illustrated in FIG. 4 with the master film strip 30 being advanced one step at a time through the processing stations and the null positions, and with simultaneous processing occurring at the processing stations during repetitive cycles of operation.

Although the present invention has been described in connection with details of the preferred embodiments, many alterations and modifications may be made without departing from the invention. Accordingly, it is intended that all such alterations and modifications be considered as within the spirit and scope of the invention as defined in the appended claims.

I claim:

1. In a microimage recording apparatus of the type including exposure, master developing and duplication stations along a master film strip path and means for presenting duplicate film at the duplication station for the exposure of a microfiche array of images on the duplicate film from images on the master film, the improvement comprising:

drive means for moving the master film strip along the master film strip path;

an optics assembly at the exposure station for holding the master film strip stationary and for sequentially projecting numerous discrete light images in an array of rows and columns onto an image area of the master film;

means at the master developer station for heating an image area of the master film strip to simultaneously develop the entire array of exposed images in the image area; and means at the duplication station for transferring onto the duplicate film as exposed images the entire array of exposed and developed images from a master film strip image area.

2. The improvement claimed in claim 1 wherein said optics assembly includes a lens through which discrete light images are focused, and positioning means for moving said lens in two directions for directing the discrete light images at predetermined locations in the rows and columns of the image area array.

3. The improvement claimed in claim 2, said positioning means including an X-Y drive supporting said lens for movement in the directions of rows and columns of the image area array.

4. The improvement claimed in claim 3, said optics assembly including a clamp member supported by said X-Y drive for movement with said lens, and clamp operating means connected to said clamp member for moving said clamp member in a third direction toward and away from said lens.

5. The improvement claimed in claim 1, said transferring means at said duplication station including a clamp structure for holding the master film strip and the duplicate film stationary and in contact with one another, and a duplicate film exposure lamp for directing light through the array of exposed and developed master film strip images onto a duplicate film image area.

6. The improvement claimed in claim 5 further comprising a shutter in the light path between said duplicate film exposure lamp and the master film strip image array.

7. The improvement claimed in claim 5, further comprising means for moving a strip of duplicate film along a duplicate film path through the duplication station.

8. The improvement claimed in claim 7 further comprising a duplicate film developer station adjacent said duplicate film path including means for heating an exposed image array on the duplicate film strip.

9. The improvement claimed in claim 7 further comprising a cutting station adjacent said duplicate film path including means for severing a microfiche containing an exposed image array from the duplicate film strip.

10. The improvement claimed in claim 7 further comprising a clearing station adjacent said duplicate film path including a source of film clearing radiation adjacent a developed image array disposed in said clearing path.

11. Microimage recording apparatus for recording computer generated images on microfilm, said apparatus comprising:

a self-contained housing including a microfilm record output port;

means for supporting and advancing strips of master film and duplicate film respectively along a master film processing path and a duplicate film processing path within said housing;

an exposure station along said master film processing path for exposing said master film with the computer generated images and creating latent images on said master film;

a master developing station along said master film processing path for developing said master film latent images;

a duplication station;

said master and duplicate film processing paths coinciding at said duplication station;

said duplication station including means for creating latent images on said duplicate film from developed images on said master film;

a duplicate developing station along said duplicate film processing path for developing latent images on the duplicate film;

a cutting station along said duplicate film processing path for cutting individual microfilm records from the end of the duplicate film strip; and means for depositing developed and cut microfilm records at said exit port.

12. A method for forming completed microfiche records each having an array of copies of a series of computer generated images comprising repetitively:

moving a strip of master film along a first path including an exposure station, a master developer station and a duplication station;

moving a strip of duplicate film along a second path including the duplication station and a duplicate developing station;

stopping both strips, and carrying out the following steps while said strips are stopped:
 (a) exposing a pattern of latent images on the master film at the exposure station from one series of computer-generated images;
 (b) developing in one step an entire pattern of latent images at the master developing station; and
 (c) duplicating in one step an entire pattern of developed master images as latent images on the duplicate film at the duplication station.

13. The method of claim 12 further comprising carrying out the following additional steps:
 (d) developing a pattern of latent images on the duplicate film at a duplicate developer station; and
 (e) cutting a microfiche containing a pattern of duplicated images from the end of the duplicate film strip.

14. The method of claim 13, said method further comprising:

moving the strip of duplicate film along the second path while the strip of master film is stopped; and stopping the strip of duplicate film and carrying out said steps (c), (d) and (e) without carrying out said steps (a) and (b) to form multiple copy arrays of a single pattern of developed master images.

15. Microimage recording apparatus comprising:

a self-contained housing;

means in said housing for supplying a master film and a duplicate film;

a first path within said housing for travel of the master film and a second path within said housing for travel of the duplicate film;

an exposure station on said first path including means for exposing the master film with light images;

a master developer station on said first path including means for developing exposed images on the master film;

a duplication station, said first and second paths merging at said duplication station and said duplication station including means for exposing the duplicate film from the developed images on the master film; and a duplicate developer station on said second path including means for heating the duplicate film to develop exposed images on the duplicate film.

16. The apparatus of claim 15 wherein said means for supplying master film includes means at the start of said first path for supplying master film to said first path in strip form, and strip take up means for receiving the master film strip from said first path.

17. The apparatus of claim 15 wherein said means for supplying duplicate film includes means for supplying duplicate film to said second path in strip form.

18. The apparatus of claim 17 further including a cutting station on said second path for severing discrete microimage segments from the end of the duplicate film strip.

19. The apparatus of claim 18 wherein said cutting station is disposed between said duplication station and said duplicate developer station.

20. The apparatus of claim 18 further comprising an output port accessible from outside said housing for receiving developed and severed duplicate film microimage segments from said second path.

21. The apparatus of claim 20 further comprising a clearing station adjacent said exit port for applying film clearing radiation to the duplicate film microimage segments.

22. In a microimage recording system wherein a strip of master film travels a film path through exposure, developer and duplication stations, the combination comprising:

a pair of film clamps along the film path on opposite sides of the developer station;

said clamps being movable between open and closed positions alternatively to release and clamp the film strip;

a movable film guide means between said film clamps;

a releasable latch engageable with said film guide means and movable between latched and released positions for alternatively permitting and preventing movement of the film guide means;

biasing means coupled to said film guide means for urging said film guide means against the master film strip in said film path to increase the tension of the strip when said film clamps are closed and said latch is released; and a developer member at the developer station movable against the film strip when the strip tension is increased.

23. The combination of claim 22 wherein one said film clamp is located between said exposure and developer stations for isolating the exposure station from increases in film tension.

24. The combination of claim 23 including a third film clamp on the opposite side of said exposure station from said one film clamp.

25. The combination of claim 22 wherein said developer member displaces the film strip transversely of the film path.

26. A method of tensioning film in a microimage recorder wherein a strip of master film travels between motor driven supply and take up spools through a processing path including exposure, developer and duplication stations comprising:

operating the take up motor to advance the film strip in the film path;

stopping the take up motor to stop the film strip at a selected location;

clamping the film strip at a first location within said processing path;

operating both said supply and take up motors in order to tension the film strip; and clamping the film strip at second and third locations respectively adjacent the supply and take up spools to maintain tension throughout the processing path.

27. The method of claim 26 further comprising applying a further tensioning bias to a segment of the film strip between the first location and the take up roller.

28. The method of claim 27 further comprising developing part of said segment at the developer station during the time that the further tensioning bias is applied.

29. A microimage recording method comprising:

exposing an array of discrete images in rows and columns onto an image area segment of a strip of master film;

developing the entire master film array on the image area in a single developer operation;

duplicating the entire array at a duplication station by exposing the developed images onto an image area segment of a duplicate film strip;

moving the duplicate film strip in a forward direction to move the exposed segment from the duplication station to a null position;

holding the exposed segment of the duplicate film strip in the null position for a predetermined time;

developing the exposed segment of the duplicate film strip; and cutting said segment from the duplicate film strip.

30. The method of claim 29 further comprising:

advancing the duplicate film strip to move the exposed image away from the null position after said predetermined time; and retracting said duplicate film strip after said cutting step to move an unexposed segment of the duplicate film strip into the duplication station.

31. The method of claim 30, including skipping said advancing and retracting steps when the duplicating step is repeated with a single developed image array of the master film strip.

32. The method of claim 29 wherein said array of discrete images is exposed onto said image area while said master film is held stationary.

* * * * *

UNITED STATES PATENT AND TRADEMARK OFFICE
CERTIFICATE OF CORRECTION

PATENT NO. : 4,624,558

DATED : November 25, 1986

INVENTOR(S) : Delmar R. Johnson

It is certified that error appears in the above-identified patent and that said Letters Patent are hereby corrected as shown below:

Column 4, line 35, delete "anothe" and substitute therefor --another--.

Column 10, line 66, delete the word "a" after the word "includes".

Column 11, line 33, delete "ournaled" and substitute therefor --journaled--.

Signed and Sealed this

Twenty-second Day of September, 1987

Attest:

DONALD J. QUIGG

Attesting Officer     Commissioner of Patents and Trademarks